United States Patent
Oowashi et al.

(10) Patent No.: US 10,406,784 B2
(45) Date of Patent: Sep. 10, 2019

(54) INTERMEDIATE FILM FOR LAMINATED GLASS, AND LAMINATED GLASS

(71) Applicant: SEKISUI CHEMICAL CO., LTD., Osaka (JP)

(72) Inventors: Keigo Oowashi, Osaka (JP); Taku Sasaki, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/023,428

(22) PCT Filed: Sep. 29, 2014

(86) PCT No.: PCT/JP2014/075964
§ 371 (c)(1),
(2) Date: Mar. 21, 2016

(87) PCT Pub. No.: WO2015/046541
PCT Pub. Date: Apr. 2, 2015

(65) Prior Publication Data
US 2016/0214353 A1  Jul. 28, 2016

(30) Foreign Application Priority Data

Sep. 27, 2013  (JP) .................................. 2013-202428

(51) Int. Cl.
*B32B 17/10* (2006.01)

(52) U.S. Cl.
CPC .. *B32B 17/10669* (2013.01); *B32B 17/10614* (2013.01); *B32B 17/10761* (2013.01); *B32B 17/10779* (2013.01); *B32B 2264/10* (2013.01)

(58) Field of Classification Search
CPC ........ B32B 17/10678; B32B 17/10036; B32B 17/10633; B32B 17/10651; B32B 17/10761
See application file for complete search history.

(56) References Cited

U.S. PATENT DOCUMENTS

| 3,762,988 A | 10/1973 | Clock et al. |
| 2005/0094109 A1* | 5/2005 | Sun ........................ G03B 21/60 353/79 |
| 2006/0066508 A1 | 3/2006 | Walck et al. |
| 2006/0110593 A1* | 5/2006 | Fukatani ........... B32B 17/10036 428/328 |
| 2012/0068083 A1 | 3/2012 | Labrot et al. |
| 2013/0043406 A1* | 2/2013 | Huignard .................. C03C 8/14 250/459.1 |

FOREIGN PATENT DOCUMENTS

| CN | 1875317 | 12/2006 |
| CN | 102618180 | 8/2012 |
| JP | 3-295828 | 12/1991 |
| WO | 2005/043232 | 5/2005 |
| WO | 2010/139889 | 12/2010 |
| WO | 2012/098511 | 7/2012 |

OTHER PUBLICATIONS

International Search Report dated Oct. 28, 2014 in International Application No. PCT/JP2014/075964.

* cited by examiner

*Primary Examiner* — Cheng Yuan Huang

(74) *Attorney, Agent, or Firm* — Wenderoth, Lind & Ponack, L.L.P.

(57) ABSTRACT

The present invention provides an interlayer film for laminated glass provided with an up-conversion function so as to be able to display high-contrast images while ensuring safety, and a laminated glass. The present invention relates to an interlayer film for laminated glass, including lanthanoid-containing inorganic fine particles having an up-conversion function and a binder resin.

5 Claims, No Drawings

INTERMEDIATE FILM FOR LAMINATED GLASS, AND LAMINATED GLASS

TECHNICAL FIELD

The present invention relates to an interlayer film for laminated glass provided with an up-conversion function so as to be able to display high-contrast images while ensuring safety, and a laminated glass.

BACKGROUND ART

Inorganic fine particles having an "up-conversion" function of converting long wavelength light such as infrared rays to short wavelength light such as visible light or ultraviolet rays are expected to be used for medical purposes as biomarkers or the like. Recently, a highly functionalized material including a matrix material in which such inorganic fine particles are dispersed to impart an up-conversion function has been drawing attention.

Known examples of the inorganic fine particles having an up-conversion function include those mainly containing lanthanoid elements. For the up-conversion function, a phenomenon called "multiphoton excitation" derived from the energy level difference of these elements is utilized.

Irradiation of glass containing lanthanoid elements with infrared rays is known to generate up-conversion fluorescence within a visible region on a short-wavelength side. For example, Patent Literature 1 discloses that up-conversion glass containing a heavy metal oxide (e.g., $TeO_2$, $Ga_2O_3$, PbO, $Bi_2O_3$, $GeO_2$) and $Er_2O_3$ as a rare earth element oxide can provide emission of light having a peak at around 560 to 565 nm.

Patent Literature 2 discloses a laminated glass comprising two transparent plates and a hydroxy terephthalate-containing intermediate layer interposed between the transparent plates. Such a laminated glass can display information when irradiated with specific light.

Use of exciting ultraviolet laser as irradiation light, however, has a problem of safety.

CITATION LIST

Patent Literature

Patent Literature 1: JP-A H03-295828
Patent Literature 2: WO 2010/139889

SUMMARY OF INVENTION

Technical Problem

The present invention aims to provide, in consideration of the state of the art, an interlayer film for laminated glass provided with an up-conversion function so as to be able to display high-contrast images while ensuring safety, and a laminated glass.

Solution to Problem

The present invention relates to an interlayer film for laminated glass, including lanthanoid-containing inorganic fine particles having an up-conversion function and a binder resin.

The present invention is specifically described in the following.

The interlayer film for laminated glass of the present invention contains lanthanoid-containing inorganic fine particles having an up-conversion function.

Containing the lanthanoid-containing inorganic fine particles, the interlayer film for laminated glass of the present invention is provided with an "up-conversion" function of converting a long-wavelength light such as infrared rays to a short-wavelength light such as visible light or ultraviolet rays. This function enables generation of short-wavelength light from highly safe long-wavelength light such as infrared rays, without using ultraviolet rays. As a result, high-contrast images can be displayed on a laminated glass.

In the present invention, the "up-conversion function" refers to a function of converting long-wavelength light such as infrared rays to short-wavelength light such as visible light or ultraviolet rays.

The interlayer film for laminated glass of the present invention may have a multilayer structure as long as it contains lanthanoid-containing inorganic fine particles having an up-conversion function and a binder resin. For example, the interlayer film for laminated glass of the present invention may have a multilayer structure including an up-conversion layer that contains lanthanoid-containing inorganic fine particles having an up-conversion function and a binder resin, and a first resin layer that contains a thermoplastic resin. Containing another layer such as the first resin layer in addition to the up-conversion layer, the interlayer film for laminated glass can have another function while keeping emission of high-contrast light.

In the interlayer film for laminated glass of the present invention, a first resin layer containing a thermoplastic resin, an up-conversion layer containing the lanthanoid-containing inorganic fine particles having an up-conversion function and the binder resin, and a second resin layer containing a thermoplastic resin are preferably laminated in the stated order in the thickness direction. When the first resin layer, the up-conversion layer, and the second resin layer are laminated in the stated order in the thickness direction, the adhesion to glass can be appropriately adjusted while emission of high-contrast light is kept. As a result, a laminated glass excellent in shatterproof properties can be obtained.

The lanthanoid in the lanthanoid-containing inorganic fine particles is not particularly limited as long as it is a rare earth element capable of performing up-conversion light emission by being excited by light of a wavelength within a predetermined range. Examples thereof include erbium (Er), holmium (Ho), praseodymium (Pr), thulium (Tm), neodymium (Nd), gadolinium (Gd), europium (Eu), ytterbium (Yb), samarium (Sm), and cerium (Ce). Each of these lanthanoids may be used alone, or two or more of these may be used in combination.

Preferred is a combination of any two or more of erbium, holmium, thulium, and ytterbium which emit light of a wavelength within a visible light range. Particularly preferred is a combination of ytterbium that has strong absorption at around 10000 $cm^{-1}$ and at least one selected from erbium, holmium, and thulium that emit light upon energy transfer from ytterbium and the emitted light has a wavelength within a visible light range.

When the lanthanoid-containing inorganic fine particles contain ytterbium and at least one selected from erbium, holmium, and thulium, in terms of a ratio (A/B) of the amount (A) of ytterbium and the amount (B) of at least one selected from erbium, holmium, and thulium in the lanthanoid inorganic fine particles, the lower limit in the atomic composition is preferably 1, more preferably 5, whereas the upper limit thereof is preferably 50, more preferably 40.

When the ratio (A/B) of the amount (A) of ytterbium and the amount (B) of at least one selected from erbium, holmium, and thulium in the lanthanoid inorganic fine particles is equal to or more than the preferable lower limit and equal to or less than the preferable upper limit, upon use of ytterbium and at least one selected from erbium, holmium, and thulium in combination, energy absorbed by ytterbium can be transferred to at least one lanthanoid selected from erbium, holmium, and thulium in the lanthanoid-containing inorganic fine particles uniformly without excess or insufficiency. As a result, highly efficient up-conversion light emission can be achieved.

In terms of the particle size of the lanthanoid-containing inorganic fine particles, the lower limit of the average particle size of primary particles is preferably 5 nm, whereas the upper limit thereof is preferably 1 μm. If the average particle size is less than 5 nm, actual production thereof may be difficult. If the average particle size is more than 1 μm, maintenance of the transparency may be difficult.

The "average particle size" refers to the volume average particle size. The average particle size can be measured with a particle size distribution measuring apparatus ("UPA-EX150" produced by NIKKISO CO., LTD.), a dynamic light scattering analyzer (NICOMP-380DLS produced by PSS), or the like.

The amount of the lanthanoid-containing inorganic fine particles in the interlayer film for laminated glass of the present invention is not particularly limited. The lower limit of the amount of the lanthanoid-containing inorganic fine particles is preferably 0.0001 parts by mass, more preferably 0.01 parts by mass, whereas the upper limit thereof is preferably 20 parts by mass, more preferably 10 parts by mass based on 100 parts by mass of the binder resin. When the amount of the lanthanoid-containing inorganic fine particles is within the preferable range, sufficiently high-contrast light emission can be achieved upon irradiation with light of a specific wavelength.

The amount of the lanthanoid-containing inorganic fine particles is preferably 0.00007% by mass or more, more preferably 0.007% by mass or more, and preferably 12.5% by mass or less, more preferably 6.7% by mass or less based on 100% by mass of the interlayer film for laminated glass of the present invention. When the amount of the lanthanoid-containing inorganic fine particles in the interlayer film for laminated glass of the present invention is within the preferable range, sufficiently high-contrast light emission can be achieved upon irradiation with light of a specific wavelength.

The lanthanoid-containing inorganic fine particles may contain an element having a similar ion radius and a similar crystalline structure to those of the lanthanoids, or a compound thereof. The compound of an element having a similar ion radius and a similar crystalline structure as those of the lanthanoids is preferably an oxide or a halide. Examples of the element having a similar ion radius and a similar crystalline structure as those of the lanthanoids include rare earth elements other than the lanthanoids, and examples of the compound thereof include oxides and halides of rare earth elements other than the lanthanoids. Examples of the rare earth elements other than the lanthanoids include yttrium (Y) and scandium (Sc). Examples of the compound of the rare earth elements other than the lanthanoids include oxides and halides of each of yttrium (Y) and scandium (Sc).

In particular, the lanthanoid-containing inorganic fine particles preferably contain yttrium (Y), an oxide of yttrium, or a halide of yttrium because highly efficient energy transfer can be expected between the lanthanoids in the lanthanoid-containing inorganic fine particles so that improvement of the light emission efficiency can be expected. The oxide of yttrium is preferably $Y_2O_3$, and the halide of yttrium is preferably $NaYF_4$.

The lanthanoid-containing inorganic fine particles preferably contain $Y_2O_3$ or $NaYF_4$ as a compound of an element having a similar ion radius and a similar crystalline structure to those of the lanthanoids, and ytterbium and at least one selected from erbium, holmium, and thulium as the lanthanoids.

The total amount of the lanthanoids contained in the lanthanoid-containing inorganic fine particles is preferably 2 atom % or higher, more preferably 2.5 atom % or higher, and 50 atom % or lower, more preferably 25 atom % or lower based on 100 atom % in total of the atomic composition ratio of the lanthanoids contained in the lanthanoid-containing inorganic fine particles and the element having a similar ion radius and a similar crystalline structure. When the total amount of the lanthanoids in the lanthanoid-containing inorganic fine particles is equal to or more than the preferable lower limit and equal to or less than the preferably upper limit, the lanthanoids in the lanthanoid-containing inorganic fine particles can substitute and dope without breaking the crystalline structure constituted by the element having a similar ion radius and a similar crystalline structure to those of the lanthanoids. In such a case, the efficiency of energy transfer in the lanthanoid-containing inorganic fine particles is not impaired but maintained. The amount of the lanthanoids contained in the lanthanoid-containing inorganic fine particles can be measured with, for example, a fluorescence X-ray analyzer (EDX-800HS produced by Shimadzu Corporation).

The amount of the element having a similar ion radius and a similar crystalline structure to those of the lanthanoids is preferably 5 atom % or higher, more preferably 10 atom % or higher, and preferably 98 atom % or lower, more preferably 80 atom % or lower based on 100 atom % in total of the atomic composition ratio of the lanthanoids contained in the lanthanoid-containing inorganic fine particles and the element having a similar ion radius and a similar crystalline structure to those of the lanthanoids. When the amount of the element having a similar ion radius and a similar crystalline structure to those of the lanthanoids is equal to or more than the preferable lower limit and equal to or less than the preferable upper limit, the regular array structure of a crystalline structure as a host material to be doped with the lanthanoids can be formed to increase the efficiency of energy transfer in the lanthanoid-containing inorganic fine particles. As a result, the light emission efficiency is improved. The amount of the element having a similar ion radius and a similar crystalline structure to those of the lanthanoids can be measured with, for example, a fluorescence X-ray analyzer (EDX-800HS produced by Shimadzu Corporation).

The interlayer film for laminated glass of the present invention contains a binder resin.

The binder resin is preferably a thermoplastic resin. Specific examples thereof include polyvinyl acetal resins, ethylene-vinyl acetate copolymers, ethylene-acrylic copolymers, polyurethane resins, polyvinyl alcohol resins, and polyester resins. A thermoplastic resin other than these may also be used.

The binder resin is preferably a polyvinyl acetal resin because it is versatile. In cases where the interlayer film for laminated glass of the present invention has a multilayer structure and includes the up-conversion layer, the binder resin contained in the up-conversion layer is preferably a polyvinyl acetal resin or a polyester resin. When the binder resin in the up-conversion layer is a polyvinyl acetal resin, the adhesion to the layers other than the up-conversion layer is improved. When the binder resin in the up-conversion layer is a polyester resin, the long-term stability of the up-conversion layer is improved.

The polyvinyl acetal resin can be produced, for example, by acetalization of polyvinyl alcohol with an aldehyde. The polyvinyl alcohol can be produced, for example, by saponification of polyvinyl acetate. The saponification degree of the polyvinyl alcohol is commonly within a range of 80 to 99.8 mol %.

The lower limit of the polymerization degree of the polyvinyl alcohol is preferably 200, more preferably 500, whereas the upper limit thereof is preferably 3,000, more preferably 2,500. When the polymerization degree is 200 or more, the obtained laminated glass can have improved penetration resistance. When the polymerization degree is 3,000 or less, moldability of the interlayer film for laminated glass can be improved.

The aldehyde is not particularly limited. Commonly, a C1-C10 aldehyde is favorably used. Examples of the C1-C10 aldehyde include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these is propionaldehyde, n-butyraldehyde, isobutyl aldehyde, n-hexylaldehyde, or n-valeraldehyde, more preferred is propionaldehyde, n-butyraldehyde, or isobutyraldehyde, and still more preferred is n-butyraldehyde. Single aldehyde may be used alone, or two or more thereof may be used in combination.

From the standpoint of further enhancing the adhesion force of the interlayer film for laminated glass of the present invention, the polyvinyl acetal resin has a hydroxy group content (amount of hydroxy groups) of preferably 15 to 40 mol %. The lower limit of the hydroxy group content is more preferably 18 mol %, and the upper limit thereof is more preferably 35 mol %. When the hydroxy group content is 15 mol % or higher, the adhesion force can be further enhanced. When the hydroxy group content is 40 mol % or lower, flexibility of the interlayer film for laminated glass is enhanced, leading to favorable handleability.

The hydroxy group content of the polyvinyl acetal resin is a value in percentage of the mole fraction calculated by dividing the amount of ethylene groups to which hydroxy groups are bonded by the amount of all ethylene groups in the backbone. The amount of ethylene groups to which hydroxy groups are bonded can be obtained by measuring the amount of ethylene groups to which hydroxy groups are bonded in polyvinyl alcohol that is used as a raw material in conformity with JIS K6726 "Testing methods for polyvinyl alcohol".

The lower limit of the acetylation degree (amount of acetyl groups) of the polyvinyl acetal resin is preferably 0.1 mol %, more preferably 0.3 mol %, still more preferably 0.5 mol %, whereas the upper limit thereof is preferably 30 mol %, more preferably 25 mol %, still more preferably 20 mol %.

When the acetylation degree is 0.1 mol % or higher, compatibility between the polyvinyl acetal resin and the plasticizer can be increased. When the acetylation degree is 30 mol % or lower, moisture resistance of the interlayer film is improved.

The acetylation degree is a value in percentage of the mole fraction calculated by subtracting the amount of ethylene groups to which acetal groups are bonded and the amount of ethylene groups to which hydroxy groups are bonded from the amount of all ethylene groups in the backbone and then dividing the resulting value by the amount of all ethylene groups in the backbone. The amount of ethylene groups to which acetal groups are bonded can be measured in conformity with JIS K6728 "Testing methods for polyvinyl butyral".

The lower limit of the acetalization degree (butyralization degree in the case of polyvinyl butyral resin) of the polyvinyl acetal resin is preferably 60 mol %, more preferably 63 mol %, whereas the upper limit thereof is preferably 85 mol %, more preferably 75 mol %, still more preferably 70 mol %.

When the acetalization degree is 60 mol % or higher, compatibility between the polyvinyl acetal resin and the plasticizer can be increased. When the acetalization degree is 85 mol % or lower, the reaction time required for producing the polyvinyl acetal resin can be shortened. The acetalization degree is a value in percentage of the mole fraction calculated by dividing the amount of ethylene groups to which acetal groups are bonded by the amount of all ethylene groups in the backbone.

The acetalization degree can be calculated by obtaining the mole fraction based on the measurement of the acetylation degree (amount of acetyl groups) and the hydroxy group content (amount of vinyl alcohol) by a method in conformity with JIS K6728 "Testing methods for polyvinyl butyral" and then subtracting the acetylation degree and the hydroxy group content from 100 mol %.

In cases where the polyvinyl acetal resin is polyvinyl butyral resin, the acetalization degree (butyralization degree) and the acetylation degree (amount of acetyl groups) can be calculated based on the measurement by a method in conformity with JIS K6728 "Testing methods for polyvinyl butyral".

Examples of the polyester resin include polyalkylene terephthalate resins and polyalkylene naphthalate resins. Examples of the polyalkylene terephthalate resins include polyethylene terephthalate, polybutylene terephthalate, and poly-1,4-cyclohexanedimethylene terephthalate. The polyalkylene terephthalate resin is preferably polyethylene terephthalate resin because it is chemically stable and the long-term stability in the cases where lanthanoid-containing inorganic fine particles having an up-conversion function are dispersed is further enhanced. Examples of the polyalkylene naphthalate resins include polyethylene naphthalate and polybutylene naphthalate.

In the cases where the interlayer film for laminated glass of the present invention has a multilayer structure and includes the first resin layer and the second resin layer, the thermoplastic resin contained in the first resin layer and the second resin layer may be any of those exemplified for the binder resin. The thermoplastic resin contained in the first resin layer and the second resin layer is preferably a polyvinyl acetal resin because the adhesion to glass can be appropriately adjusted and a laminated glass excellent in shatterproof properties can be obtained.

The interlayer film for laminated glass of the present invention may further contain a plasticizer.

The plasticizer is not particularly limited as long as it is generally used with a polyvinyl acetal resin, and a known plasticizer commonly used as a plasticizer for interlayer films may be used. Examples thereof include organic plasticizers such as monobasic organic acid esters or polybasic organic acid esters, and phosphoric acid plasticizers such as organic phosphoric acid plasticizers or organic phosphorous acid plasticizers. Each of these plasticizers may be used alone, or two or more of these may be used in combination. The plasticizer is chosen depending on the kind of the polyvinyl acetal resin in consideration of compatibility with resin.

The monobasic organic acid ester plasticizers are not particularly limited, and examples thereof include glycol esters obtained by a reaction of glycol (e.g., triethylene glycol, tetraethylene glycol, tripropylene glycol) and a monobasic organic acid (e.g., butyric acid, isobutyric acid, caproic acid, 2-ethylbutyric acid, heptanoic acid, n-octylic acid, 2-ethylhexylic acid, pelargonic acid (n-nonylic acid), decanoic acid). Preferred among these are monobasic organic acid esters of triethylene glycol such as triethylene glycol-dicaprate, triethylene glycol-di-2-ethylbutyrate, triethylene glycol-di-n-octylate, or triethylene glycol-di-2-ethylhexylate.

The polybasic organic acid ester plasticizers are not particularly limited, and examples thereof include esters of polybasic organic acids (e.g., adipic acid, sebacic acid, azelaic acid) and linear or branched C4-C8 alcohols. Particularly preferred are dibutyl sebacate, dioctyl azelate, and dibutyl carbitol adipate.

The organic phosphoric acid plasticizers are not particularly limited, and examples thereof include tributoxyethyl phosphate, isodecylphenyl phosphate, and triisopropyl phosphate.

Particularly preferred as the plasticizer are triethylene glycol-di-ethylbutyrate, triethylene glycol-di-ethylhexoate, and triethylene glycol-di-butylsebacate.

The amount of the plasticizer is preferably 20 to 60 parts by mass based on 100 parts by mass of the binder resin. If the amount is less than 20 parts by mass, the interlayer film or the laminated glass to be obtained may have insufficient impact absorbability. If the amount is more than 60 parts by mass, the plasticizer may bleed. As a result, the interlayer film or the laminated glass to be obtained may have greater optical distortion, or the transparency or adhesion between glass and the interlayer film may lower. The amount is more preferably 30 to 50 parts by mass.

The interlayer film for laminated glass of the present invention may contain a dispersant such as glycerol esters or polycarboxylic acids for the purpose of improving the dispersibility of the lanthanoid-containing inorganic fine particles. The glycerol esters are not particularly limited, and examples thereof include decaglycerol monostearate, decaglycerol tristearate, decaglycerol decastearate, hexaglycerol monostearate, hexaglycerol distearate, hexaglycerol tristearate, hexaglycerol pentastearate, tetraglycerol monostearate, tetraglycerol tristearate, tetraglycerol pentastearate, polyglycerol stearate, glycerol monostearate, decaglycerol monooleate, decaglycerol decaoleate, hexaglycerol monooleate, hexaglycerol pentaoleate, tetraglycerol monooleate, tetraglycerol pentaoleate, polyglycerol oleate, glycerol monooleate, 2-ethyl hexanoic acid triglyceride, capric acid monoglyceride, capric acid triglyceride, myristic acid monoglyceride, myristic acid triglyceride, decaglycerol monocaprylate, polyglycerol caprylate, caprylic acid triglyceride, decaglycerol monolaurate, hexaglycerol monolaurate, tetraglycerol monolaurate, polyglycerol laurate, decaglycerol heptabehenate, decaglycerol dodecabehenate, polyglycerol behenate, decaglycerol erucate, polyglycerol erucate, tetraglycerol condensed ricinoleate, hexaglycerol condensed ricinoleate, and polyglycerol condensed ricinoleate.

Exemplary commercial products of the glycerol esters include SY Glyster CR-ED (produced by Sakamoto Yakuhin Kogyo Co., Ltd., polyglycerol condensed ricinoleate) and SY Glyster PO-5S (produced by Sakamoto Yakuhin Kogyo Co., Ltd., hexaglycerol penta-oleate).

The polycarboxylic acids are not particularly limited, and examples thereof include polycarboxylic acid polymers obtained by grafting polyoxyalkylene to a polymer having a carboxyl group in the backbone.

Exemplary commercial products of the polycarboxylic acids include MALIALIM series (AFB-0561, AKM-0531, AFB-1521, AEM-3511, AAB-0851, AWS-0851, AKM-1511-60) produced by NOF CORPORATION.

The lower limit of the dispersant content of the interlayer film for laminated glass of the present invention is preferably 1 part by mass, whereas the upper limit thereof is preferably 10000 parts by mass based on 100 parts by mass of the lanthanoid-containing inorganic fine particles. The lower limit is more preferably 10 parts by mass, whereas the upper limit is more preferably 1000 parts by mass. The lower limit is still more preferably 30 parts by mass, whereas the upper limit is still more preferably 300 parts by mass. When the dispersant content is within the above range, the lanthanoid-containing inorganic fine particles have better dispersibility. In such a case, the interlayer film for laminated glass has higher transparency.

The interlayer film for laminated glass of the present invention preferably contains an UV shielding agent. The UV shielding agent includes an ultraviolet absorber. Examples of conventionally known common UV shielding agent include metal-based UV shielding agents, metal oxide-based UV shielding agents, benzotriazole-based UV shielding agents, benzophenone-based UV shielding agents, triazine-based UV shielding agents, benzoate-based UV shielding agents, malonate-based UV shielding agents, and anilide oxalate-based UV shielding agents.

Examples of the metal-based UV shielding agents include platinum particles, silica-coated platinum particles, palladium particles, and silica-coated palladium particles. The UV shielding agent is preferably not heat shielding particles. The UV shielding agent is preferably a benzotriazole-based UV shielding agent, a benzophenone-based UV shielding agent, a triazine-based UV shielding agent, or a benzoate-based UV shielding agent. More preferred is a benzotriazole-based UV shielding agent.

Examples of the metal oxide-based UV shielding agent include zinc oxide, titanium oxide, and cerium oxide. Moreover, the surface of the metal oxide-based UV shielding agent may be coated. Exemplary coating materials of the surface of the metal oxide-based UV shielding agent include an insulative metal oxide, a hydrolyzable organic silicon compound, and a silicone compound.

Examples of the insulative metal oxide include silica, alumina, and zirconia. The insulative metal oxide has a band gap energy of, for example, 5.0 eV or more.

Examples of the benzotriazole-based UV shielding agents include 2-(2'-hydroxy-5'-methylphenyl)benzotriazole ("Tinuvin P" produced by BASF SE), 2-(2'-hydroxy-3',5'-di-t-butyl phenyl)benzotriazole ("Tinuvin 320" produced by BASF SE), 2-(2'-hydroxy-3'-t-butyl-5-methylphenyl)-5-chlorobenzotriazole ("Tinuvin 326" produced by BASF SE), and 2-(2'-hydroxy-3',5'-di-amylphenyl)benzotriazole ("Tinuvin 328" produced by BASF SE). The UV shielding agent is preferably a benzotriazole-based UV shielding agent including a halogen atom, and more preferably a benzotriazole-based UV shielding agent including a chlorine atom because it has excellent ultraviolet absorbability.

Examples of the benzophenone-based UV shielding agent include octabenzone ("Chimassorb 81" produced by BASF SE).

Examples of the triazine-based UV shielding agent include 2-(4,6-diphenyl-1,3,5-triazin-2-yl)-5-[(hexyl)oxy]-phenol ("Tinuvin 1577FF" produced by BASF SE).

Examples of the benzoate-based UV shielding agent include 2,4-di-tert-butyl phenyl-3,5-di-tert-butyl-4-hydroxy benzoate ("Tinuvin 120" produced by BASF SE).

Examples of the malonate-based UV shielding agent include [(4-methoxyphenyl)-methylene] dimethyl malonate (Hostavin PR-25 produced by CLARIANT JAPAN).

Examples of the anilide oxalate-based UV shielding agent include 2-ethyl-2'-ethoxy-oxalanilide (Sanduvor V SU produced by CLARIANT JAPAN).

The interlayer film for laminated glass of the present invention may contain heat ray-shielding particles.

The heat ray-shielding particles are not particularly limited, and preferred is at least one selected from the group consisting of tin-doped indium oxide (ITO) fine particles, antimony-doped tin oxide (ATO) fine particles, aluminum-doped zinc oxide (AZO) fine particles, indium-doped zinc oxide (IZO) fine particles, silicon-doped zinc oxide fine particles, anhydrous zinc antimonite fine particles, and lanthanum hexaboride fine particles.

The lower limit of the amount of the heat ray-shielding particles is preferably 0.005 parts by mass, whereas the upper limit thereof is preferably 3 parts by mass based on 100 parts by mass of the binder resin. If the amount is less than 0.005 parts by mass, the infrared shielding effect may not be exerted sufficiently, and the heat shielding properties of the interlayer film for laminated glass or the laminated glass to be obtained may not be sufficiently improved. If the amount is more than 3 parts by mass, the interlayer film for laminated glass or the laminated glass to be obtained may have a lowered visible light transmittance or an increased haze.

The interlayer film for laminated glass of the present invention may contain conventionally known additives such as adhesion modifiers (e.g., alkali metal salts or alkaline earth metal salts of organic acids or inorganic acids, modified silicone oil), antioxidants, light stabilizers, surfactants, flame retardants, antistatic agents, damp proofing agents, heat ray reflecting agents, or heat ray absorbing agents.

The production method of the interlayer film for laminated glass of the present invention is not particularly limited. In an exemplary method, after the process of producing lanthanoid-containing inorganic fine particles having an up-conversion function, the resulting lanthanoid-containing inorganic fine particles having an up-conversion function, a polyvinyl acetal resin, and various additives optionally added are kneaded with an extruder, plastograph, kneader, Banbury mixer, calender roll, or the like, and the resulting product is formed into a sheet by a conventional film forming method such as an extrusion method, calender method, or pressing method.

In the process of producing lanthanoid-containing inorganic fine particles having an up-conversion function, a preferable method includes a precipitation step in which an alkali solution is added to a lanthanoid-containing metal salt solution for precipitation of lanthanoid-containing hydroxide fine particles and a firing step in which the lanthanoid-containing hydroxide fine particles are fired.

Examples of the lanthanoid-containing metal salt include oxoates (e.g., nitrate, sulphate, phosphate, borate, silicate, vanadate) of the lanthanoid, organic acid salts (carboxylates, sulfonates, phenolates, sulfinates, salts of 1,3-diketone-based compounds, thiophenolates, oxime salts, salts of aromatic sulfonamides, salts of primary and secondary nitro compounds) of the lanthanoid, and lanthanoid chlorides.

Particularly preferred is nitrate.

The lower limit of the amount of the lanthanoid-containing metal salt in the lanthanoid-containing metal salt solution is preferably 0.005 mol %, and the upper limit thereof is preferably 0.5 mol %. If the amount is less than 0.005 mol %, lanthanoid-containing hydroxide fine particles may not be precipitated by addition of an alkali solution. If the amount is more than 0.5 mol %, hydroxide may be precipitated immediately after dropwise addition of an alkali solution, and the size of the lanthanoid-containing hydroxide fine particles may be difficult to control. The lower limit of the amount is more preferably 0.01 mol %, whereas the upper limit thereof is more preferably 0.25 mol %.

Examples of the solvent used in the lanthanoid-containing metal salt solution include water and hydrophilic organic solvents such as alcohols. Particularly preferred is water.

The alkali solution may be a solution containing sodium hydroxide, calcium hydroxide, ammonia, or the like.

The amount of the alkali solution is appropriately determined depending on pH of the alkali solution, and the kind or concentration of the lanthanoid-containing metal salt solution.

In the precipitation step, hardly heat-decomposable organic polymers are preferably further added. In such a case, the hardly heat-decomposable organic polymers are adsorbed to the surfaces of lanthanoid-containing hydroxide fine particles, and the hardly heat-decomposable organic polymers are heat-decomposed to give a carbide in the later firing step. The carbide present among fine particles can prevent aggregation of fine particles obtained through the firing step.

Examples of the hardly heat-decomposable organic polymers include soluble polymer compounds. Specific examples thereof include polyvinyl alcohols, polycarboxylic acids, polycarboxylic acid anhydrides, polyvinylpyrrolidone, polyvinyl acetate, methyl cellulose, ethyl cellulose, hydroxypropyl cellulose, copolymers of vinyl pyrrolidone and vinyl acetate, and copolymers of styrene and maleic acid anhydride. The polycarboxylic acids and polycarboxylic acid anhydrides are preferably comb-shaped polycarboxylic acids and comb-shaped polycarboxylic acid anhydrides in which a large number of linear and branched chains are pendant to the backbone to give a comb shape. Such polycarboxylic acids and polycarboxylic acid anhydrides are further likely to be adsorbed to the surface of the lanthanoid-containing hydroxide fine particles. Preferred as the comb-shaped polycarboxylic acids and the comb-shaped polycarboxylic acid anhydrides are maleic anhydride copolymers having a polyoxyalkylene monoalkyl ether unit, a maleic anhydride unit, and a styrene unit because such copolymers are further easily adsorbed to the surface of the lanthanoid-containing hydroxide fine particles. Preferred as the maleic anhydride copolymers are MALIALIM AKM-1511, MALIALIM AKM-0531, and MALIALIM AFB-1521 (all produced by NOF CORPORATION) because they are still further easily adsorbed to the surfaces of the lanthanoid-containing hydroxide fine particles.

The hardly heat-decomposable organic polymers preferably have at least one functional group selected from the group consisting of a carboxyl group, a carbonyl group, and a hydroxy group. In such a case, the polymers are easily adsorbed to the surfaces of the lanthanoid-containing hydroxide fine particles, so that the effects of the present invention can be sufficiently exerted.

The hardly heat-decomposable organic polymers preferably have a weight average molecular weight of 5000 to 500000. If the weight average molecular weight is less than 5000, the polymers are less likely to be left as carbide upon heat decomposition, so that the effect is less likely to be achieved. If the weight average molecular weight is more than 500000, the hardly heat-decomposable organic polymers have a great volume, and such polymers are less likely to be adsorbed to the lanthanoid-containing hydroxide fine particles uniformly. The lower limit of the weight average molecular weight is more preferably 10000, whereas the upper limit thereof is more preferably 250000.

The amount of the hardly heat-decomposable organic polymers is preferably 0.025 to 0.25% by mass based on the total amount of the lanthanoid-containing metal salt solution after addition of the alkali solution. If the amount is less than 0.025% by mass, the amount of carbide present among fine particles is small, so that the effect cannot be sufficiently achieved. If the amount is more than 0.25% by mass, the added alkali solution may be neutralized to disturb precipitation of hydroxide fine particles. The lower limit of the amount is more preferably 0.05% by mass, whereas the upper limit thereof is more preferably 0.2% by mass.

The firing step may be performed by any method, and in an exemplary method, firing is performed in a muffle furnace, a tunnel furnace, a kiln for ceramics, a gas furnace, an electric furnace, or the like. The firing step is preferably performed in air atmosphere. Moreover, a drying step may be performed before the firing step.

The firing temperature in the firing step is preferably 700° C. to 1200° C.

If the firing temperature is lower than 700° C., heat decomposition and oxidation of hydroxide fine particles may be insufficient, failing to give desired oxide fine particles. If the firing temperature is higher than 1200° C., aggregation is further promoted. In such a case, even carbide may fail to suppress aggregation.

After the firing step, a disintegration step may be performed.

The disintegration step may be performed using a bead mill, a high-energy ball mill, a high-speed conductor collision type air pulverizer, an impact type pulverizer, a gauge mill, a medium stirring mill, a high water pressure pulverizer, or the like.

A laminated glass including a pair of glass plates and the interlayer film for laminated glass of the present invention interposed between the glass plates is also encompassed by the present invention.

The glass used for the laminated glass of the present invention is not particularly limited, and a common transparent plate glass may be used. Examples thereof include various inorganic glasses such as float plate glass, polished plate glass, molded plate glass, mesh-reinforced plate glass, wire-reinforced plate glass, colored plate glass, and heat ray-absorbing glass; and organic glasses such as polycarbonate plates and polymethyl methacrylate plates. Each of these glasses may be used alone, or two or more of these may be used in combination. Particularly preferred is heat ray-absorbing glass.

The laminated glass of the present invention can be produced by a conventionally known method using the interlayer film for laminated glass of the present invention.

Applications of the laminated glass of the present invention are not particularly limited, and examples thereof include windshields, side glasses, rear glasses, and roof glasses of automobiles; glass sections of vehicles such as aircraft and trains; and building glasses. Especially, the laminated glass of the present invention is particularly suitable for applications such as windshields of automobiles which display images visible during driving.

Advantageous Effects of Invention

The present invention provides an interlayer film for laminated glass provided with an up-conversion function so as to be able to display high-contrast images while ensuring safety, and a laminated glass.

DESCRIPTION OF EMBODIMENTS

The present invention is more specifically described in the following with reference to, but not limited to, examples.

Example 1

(1) Production of Lanthanoid-Containing Inorganic Fine Particles

In an aqueous solution containing 0.1% by mass of comb-shaped polycarboxylic acid (maleic anhydride copolymer, MALIALIM AFB-1521, weight average molecular weight of 50000) were dissolved 2.98 g of yttrium nitrate, 0.83 g of ytterbium nitrate, and 0.09 g of erbium nitrate to give 150 g of a metal ion solution.

Similarly, in 50 g of an aqueous solution containing 0.1% by mass of comb-shaped polycarboxylic acid was dissolved 2.81 g of potassium hydroxide to give an alkali solution. The alkali solution was gradually added to the metal ion solution with stirring so that hydroxide fine particles were precipitated (the comb-shaped polycarboxylic acid concentration after addition of the alkali solution was 0.1% by mass).

Then, the precipitate was washed several times using a centrifugal device (CR21N produced by Hitachi Koki Co., Ltd.) and by ultrasonic dispersion with addition of pure water. Hydroxide fine particles were recovered from the resulting dispersion liquid using a centrifugal device, and dried at 80° C. for 24 hours. The resulting particles were fired in a firing furnace (KM-420 produced by ADVANTEC) under the conditions at 1000° C. for one hour in an air atmosphere to give lanthanoid-containing inorganic fine particles.

(2) Production of Interlayer Film for Laminated Glass

A light-emitting solution was prepared by blending 8.00 g of triethylene glycol di-2-ethylhexanoate (3GO) and 0.02 g of the resulting lanthanoid-containing inorganic fine particles. A total amount of the resulting dispersion liquid and 20.00 g of polyvinyl butyral resin (acetyl group content of 13 mol %, hydroxy group content of 22 mol %, average polymerization degree of 2300) (hereafter, referred to as PVB1) were sufficiently mixed and kneaded to give a resin composition.

The obtained resin composition was sandwiched between polytetrafluoroethylene (PTFE) sheets and pressurized by a hot press via a spacer having a thickness of 800 μm at 150° C. and 100 kg/cm$^2$ for 10 minutes to give an interlayer film for laminated glass having a thickness of 800 μm.

(3) Production of Laminated Glass

The resulting interlayer film for laminated glass was cut to a size of 5 cm in height×5 cm in width, and sandwiched between a pair of clear glass sheets. The resulting stack was bonded by vacuum pressing with a vacuum laminator while being held at 90° C. for 30 minutes. After the bonding, the laminated body was further bonded in an autoclave at 140° C. and 14 MPa for 20 minutes to give a laminated glass.

Example 2

An interlayer film for laminated glass and a laminated glass were produced in the same manner as in Example 1, except that 0.08 g of the obtained lanthanoid-containing inorganic fine particles was added in the step of "(2) Production of interlayer film for laminated glass" in Example 1.

Example 3

Lanthanoid-containing inorganic fine particles, an interlayer film for laminated glass, and a laminated glass were produced in the same manner as in Example 1, except that in an aqueous solution containing 0.1% by mass of comb-shaped polycarboxylic acid (MALIALIM AFB-1521, weight average molecular weight of 50000) were dissolved 2.98 g of yttrium nitrate, 0.83 g of ytterbium nitrate, and 0.09 g of holmium nitrate to give 150 g of a metal ion solution in the step of "(1) Production of lanthanoid-containing inorganic fine particles" in Example 1.

Example 4

Lanthanoid-containing inorganic fine particles, an interlayer film for laminated glass, and a laminated glass were produced in the same manner as in Example 1, except that in an aqueous solution containing 0.1% by mass of comb-shaped polycarboxylic acid (MALIALIM, AFB-1521, weight average molecular weight of 50000) were dissolved 3.72 g of yttrium nitrate, 0.11 g of ytterbium nitrate, and 0.01 g of thulium nitrate to give 150 g of a metal ion solution in the step of "(1) Production of lanthanoid-containing inorganic fine particles" in Example 1.

Example 5

An interlayer film for laminated glass and a laminated glass were produced in the same manner as in Example 1, except that PVB1 was changed to polyvinyl butyral resin (acetyl group content of 1 mol %, hydroxy group content of 30 mol %, average polymerization degree of 1700) (hereafter, referred to as PVB2) in the step of "(2) Production of interlayer film for laminated glass" in Example 1.

Example 6

An interlayer film for laminated glass and a laminated glass were produced in the same manner as in Example 1, except that 0.08 g of the resulting lanthanoid-containing inorganic fine particles were added and PVB1 was changed to PVB2 in the step of "(2) Production of interlayer film for laminated glass" in Example 1.

Example 7

Lanthanoid-containing inorganic fine particles, an interlayer film for laminated glass, and a laminated glass were produced in the same manner as in Example 1, except that in an aqueous solution containing 0.1% by mass of comb-shaped polycarboxylic acid (MALIALIM AFB-1521, weight average molecular weight of 50000) were dissolved 2.98 g of yttrium nitrate, 0.83 g of ytterbium nitrate, and 0.09 g of holmium nitrate to give 150 g of a metal ion solution in the step of "(1) production of lanthanoid-containing inorganic fine particles" and that PVB1 was changed to PVB2 in the step of "(2) Production of interlayer film for laminated glass" in Example 1.

Example 8

Lanthanoid-containing inorganic fine particles, an interlayer film for laminated glass, and a laminated glass were produced in the same manner as in Example 1, except that in an aqueous solution containing 0.1% by mass of comb-shaped polycarboxylic acid (MALIALIM AFB-1521, weight average molecular weight of 50000) were dissolved 3.72 g of yttrium nitrate, 0.11 g of ytterbium nitrate, and 0.01 g of thulium nitrate to give 150 g of a metal ion solution in the step of "(1) Production of lanthanoid-containing inorganic fine particles" and that PVB1 was changed to PVB2 in the step of "(2) Production of interlayer film for laminated glass" in Example 1.

Example 9

An interlayer film for laminated glass and a laminated glass were produced in the same manner as in Example 1, except that a commercially available fluoride-based lanthanoid-containing inorganic fine particles $NaYF_4$:Yb,Er (produced by Sigma-Aldrich Co. LLC., volume average particle size of 1000 nm) having an up-conversion function were used instead of the lanthanoid-containing inorganic fine particles produced in the step of "(1) Production of lanthanoid-containing inorganic fine particles" and that PVB1 was changed to PVB2 in the step of "(2) Production of interlayer film for laminated glass" in Example 1.

Example 10

An interlayer film for laminated glass and a laminated glass were produced in the same manner as in Example 1, except that commercially available fluoride-based lanthanoid-containing inorganic fine particles $NaYF_4$:Yb,Er (produced by Sigma-Aldrich Co. LLC.) having an up-conversion function and pulverized to a volume average particle size of 230 nm with a bead mill were used instead of the lanthanoid-containing inorganic fine particles produced in the step of "(1) Production of lanthanoid-containing inorganic fine particles" and that PVB1 was changed to PVB2 in the step of "(2) Production of interlayer film for laminated glass" in Example 1.

Example 11

An interlayer film for laminated glass and a laminated glass were produced in the same manner as in Example 1, except that a commercially available fluoride-based lanthanoid-containing inorganic fine particles $NaYF_4$:Yb,Er (produced by Sigma-Aldrich Co. LLC.) having an up-conversion function and pulverized to the volume average particle size of 230 nm were used instead of the lanthanoid-containing inorganic fine particles obtained in the step of "(1) Production of lanthanoid-containing inorganic fine particles", that the amount of the commercially available fluoride-based lanthanoid-containing inorganic fine particles having an up-conversion function was changed to 0.04 g, and that PVB1 was changed to PVB2 in the step of "(2) Production of interlayer film for laminated glass" in Example 1.

Comparative Example 1

An interlayer film for laminated glass and a laminated glass were produced in the same manner as in Example 1, except that lanthanoid-containing inorganic fine particles were not added in the step of "(2) Production of interlayer film for laminated glass" in Example 1.

Example 12

Production of Up-Conversion Layer

An amount of 8.00 g of triethylene glycol di-2-ethylhexanoate (3GO) was blended with 0.02 g of the lanthanoid-containing inorganic fine particles obtained in the step of "(1) Production of lanthanoid-containing inorganic fine particles" to prepare a light-emitting solution. A total amount of the obtained light-emitting solution and 20.00 g of polyvinyl butyral resin (PVB2) were sufficiently mixed and kneaded to give a resin composition. The resulting resin composition was sandwiched between polytetrafluoroethylene (PTFE) sheets, and pressurized by heat-pressing via a spacer having a thickness of 100 μm at 150° C. and 100 kg/cm$^2$ for 10 minutes to give an up-conversion layer having a thickness of 100 μm.
(Production of First Resin Layer and Second Resin Layer)
An amount of 8.00 g of triethylene glycol di-2-ethylhexanoate (3GO) and 20.00 g of PVB2 were sufficiently mixed and kneaded to give a resin composition. The resulting resin composition was sandwiched between polytetrafluoroethylene (PTFE) sheets, and pressurized by heat-pressing via a spacer having a thickness of 400 μm at 150° C. and 100 kg/cm$^2$ for 10 minutes to give a first resin layer having a thickness of 400 μm. A second resin layer was produced in the same manner.

The first resin layer, the up-conversion layer, and the second resin layer were sequentially laminated in the thickness direction to give an interlayer film for laminated glass. The obtained interlayer film for laminated glass was cut to a size of 5 cm in height×5 cm in width, and sandwiched between a pair of clear glass sheets. The resulting stack was bonded by vacuum pressing with a vacuum laminator while being held at 90° C. for 30 minutes. After the bonding, the laminated body was further bonded in an autoclave at 140° C. and 14 MPa for 20 minutes to give a laminated glass.

Example 13

An interlayer film for laminated glass and a laminated glass were produced in the same manner as in Example 12, except that commercially available fluoride-based lanthanoid-containing inorganic fine particles NaYF$_4$:Yb,Er (produced by Sigma-Aldrich Co. LLC.) having an up-conversion function and pulverized with a bead mill to the volume average particle size of 230 nm were used instead of the lanthanoid-containing inorganic fine particles obtained in the step of "(1) Production of lanthanoid-containing inorganic fine particles" in Example 1.

Example 14

An interlayer film for laminated glass and a laminated glass were produced in the same manner as in Example 12, except that PVB2 resin was changed to PVB1 resin and that the amount of triethylene glycol di-2-ethylhexanoate (3GO) was changed to 12.00 g in production of an up-conversion layer.

Example 15

Lanthanoid-containing inorganic fine particles were produced in the same manner as in Example 1, except that in an aqueous solution containing 0.1% by mass of comb-shaped polycarboxylic acid (MALIALIM AFB-1521, weight average molecular weight of 50000) were dissolved 2.98 g of yttrium nitrate, 0.83 g of ytterbium nitrate, and 0.09 g of holmium nitrate to give 150 g of a metal ion solution in the step of "(1) Production of lanthanoid-containing inorganic fine particles" in Example 1. An up-conversion layer was produced in the same manner as in Example 12, except that the resulting lanthanoid-containing inorganic fine particles were used, that the amount thereof was changed to 0.04 g, and that PVB2 was changed to polyethylene terephthalate resin. Using the up-conversion layer, an interlayer film for laminated glass and a laminated glass were produced.

Example 16

An interlayer film for laminated glass and a laminated glass were produced in the same manner as in Example 12, except that commercially available fluoride-based lanthanoid-containing inorganic fine particles NaYF$_4$:Yb,Er (produced by Sigma-Aldrich Co. LLC., volume average particle size of 1000 nm) having an up-conversion function were used instead of the lanthanoid-containing inorganic fine particles obtained in the step of "(1) Production of lanthanoid-containing inorganic fine particles" in Example 1, and that PVB2 was changed to polyethylene terephthalate resin in production of an up-conversion layer.

Comparative Example 2

An interlayer film for laminated glass and a laminated glass were produced in the same manner as in Example 12, except that the lanthanoid-containing inorganic fine particles were not used.
(Evaluation)
The lanthanoid-containing inorganic fine particles, the interlayer films for laminated glass, and the laminated glasses obtained in the examples and comparative examples were evaluated by the following methods.

Tables 1 and 2 show the results. In Tables 1 and 2, the amounts (parts by mass) of a thermoplastic resin, a plasticizer, and lanthanoid-containing inorganic fine particles were determined based on the amount of the thermoplastic resin set to 100 parts by mass in each resin layer.
(1) Measurement of Average Particle Size
The volume average particle size of the obtained lanthanoid-containing inorganic fine particles was measured with a dynamic light scattering analyzer (NICOMP-380DLS produced by PSS).
(2) Composition Analysis of Lanthanoid Elements
The composition ratios of elements contained in the obtained lanthanoid-containing inorganic fine particles and commercially available fluoride-based lanthanoid-containing inorganic fine particles having an up-conversion function were measured with a fluorescent X-ray analyzer (EDX-800HS produced by Shimadzu Corporation). The calculation was based on the total composition ratio of yttrium, ytterbium, erbium, holmium, and thulium taken as 100 atom %.
(3) Light Emitting Properties
The entire surface of the obtained laminated glass placed in a dark room was irradiated with light from an infrared ray generator (L980P300J produced by THORLABS) at a wavelength of 980 nm and an output of 30 mW and 60 mW. The laminated glass was visually observed. It is evaluated as "Excellent (OO)" when emission of light was clearly observed at a central portion of the laminated glass. It is evaluated as "Good (O)" when emission of light was not clearly but slightly observed at a central portion of the laminated glass. It is evaluated as "Poor (x)" when emission of light was not observed.

TABLE 1

| | Thermoplastic resin | | Plasticizer | | Inorganic fine particles | | | | | | | | Evaluation Light emitting properties | |
|---|---|---|---|---|---|---|---|---|---|---|---|---|---|---|
| | | | | | | Volume average particle size (nm) | Fluorescent X-ray analysis (atom %) | | | | | Amount (parts by mass) | | |
| | Composition | Amount (parts by mass) | Composition | Amount (parts by mass) | Composition | | Y | Yb | Er | Ho | Tm | | 30 mW | 60 mW |
| Example 1 | PVB1 | 100 | 3GO | 40 | $Y_2O_3$:Yb, Er | 300 | 74.8 | 22.8 | 2.4 | — | — | 0.1 | ◯◯ | ◯◯ |
| Example 2 | PVB1 | 100 | 3GO | 40 | $Y_2O_3$:Yb, Er | 300 | 74.8 | 22.8 | 2.4 | — | — | 0.4 | ◯◯ | ◯◯ |
| Example 3 | PVB1 | 100 | 3GO | 40 | $Y_2O_3$:Yb, Ho | 320 | 74.6 | 23.1 | — | 2.3 | — | 0.1 | ◯ | ◯◯ |
| Example 4 | PVB1 | 100 | 3GO | 40 | $Y_2O_3$:Yb, Tm | 280 | 97.2 | 2.5 | — | — | 0.3 | 0.1 | ◯ | ◯ |
| Example 5 | PVB2 | 100 | 3GO | 40 | $Y_2O_3$:Yb, Er | 300 | 74.8 | 22.8 | 2.4 | — | — | 0.1 | ◯◯ | ◯◯ |
| Example 6 | PVB2 | 100 | 3GO | 40 | $Y_2O_3$:Yb, Er | 300 | 74.8 | 22.8 | 2.4 | — | — | 0.4 | ◯◯ | ◯◯ |
| Example 7 | PVB2 | 100 | 3GO | 40 | $Y_2O_3$:Yb, Ho | 320 | 74.6 | 23.1 | 2.3 | — | — | 0.1 | ◯ | ◯◯ |
| Example 8 | PVB2 | 100 | 3GO | 40 | $Y_2O_3$:Yb, Tm | 280 | 97.2 | 2.5 | — | — | 0.3 | 0.1 | ◯ | ◯ |
| Example 9 | PVB2 | 100 | 3GO | 40 | $NaYF_4$:Yb, Er | 1000 | 78.6 | 19.4 | 2.0 | — | — | 0.1 | ◯◯ | ◯◯ |
| Example 10 | PVB2 | 100 | 3GO | 40 | $NaYF_4$:Yb, Er | 230 | 78.6 | 19.4 | 2.0 | — | — | 0.1 | ◯ | ◯◯ |
| Example 11 | PVB2 | 100 | 3GO | 40 | $NaYF_4$:Yb, Er | 230 | 78.6 | 19.4 | 2.0 | — | — | 0.2 | ◯ | ◯◯ |
| Comparative Examepl 1 | PVB1 | 100 | 3GO | 40 | — | — | — | — | — | — | — | — | X | X |

TABLE 2

| | First resin layer | | | | Up-conversion layer | | | | Up-conversion particles | |
|---|---|---|---|---|---|---|---|---|---|---|
| | Thermoplastic resin | | Plasticizer | | Thermoplastic resin | | Plasticizer | | | Volume average particle size (nm) |
| | Composition | Amount (parts by mass) | Composition | Amount (parts by mass) | Composition | Amount (parts by mass) | Composition | Amount (parts by mass) | Composition | |
| Example 12 | PVB2 | 100 | 3GO | 40 | PVB2 | 100 | 3GO | 40 | $Y_2O_3$:Yb, Er | 300 |
| Example 13 | PVB2 | 100 | 3GO | 40 | PVB2 | 100 | 3GO | 40 | $NaYF_4$:Yb, Er | 230 |
| Example 14 | PVB2 | 100 | 3GO | 40 | PVB1 | 100 | 3GO | 60 | $Y_2O_3$:Yb, Er | 300 |
| Example 15 | PVB2 | 100 | 3GO | 40 | PET | 100 | — | — | $Y_2O_3$:Yb, Ho | 320 |
| Example 16 | PVB2 | 100 | 3GO | 40 | PET | 100 | — | — | $NaYF_4$:Yb, Er | 1000 |
| Comparative Example 2 | PVB2 | 100 | 3GO | 40 | PVB2 | 100 | 3GO | 40 | — | — |

| | Up-conversion layer | | | | | | Second resin layer | | | | Evaluation Light emitting properties | |
|---|---|---|---|---|---|---|---|---|---|---|---|---|
| | Up-conversion particles | | | | | | Thermoplastic resin | | Plasticizer | | | |
| | Fluorescent X-ray analysis (atom %) | | | | | Amount (parts by mass) | | Amount (parts by mass) | | Amount (parts by mass) | | |
| | Y | Yb | Er | Ho | Tm | | Composition | | Composition | | 30 mW | 60 mW |
| Example 12 | 74.8 | 22.8 | 2.4 | — | — | 0.1 | PVB2 | 100 | 3GO | 40 | ◯◯ | ◯◯ |
| Example 13 | 78.6 | 19.4 | 2.0 | — | — | 0.1 | PVB2 | 100 | 3GO | 40 | ◯ | ◯◯ |
| Example 14 | 74.8 | 22.8 | 2.4 | — | — | 0.1 | PVB2 | 100 | 3GO | 40 | ◯◯ | ◯◯ |
| Example 15 | 74.6 | 23.1 | — | 2.3 | — | 0.2 | PVB2 | 100 | 3GO | 40 | ◯ | ◯◯ |
| Example 16 | 78.6 | 19.4 | 2.0 | — | — | 0.1 | PVB2 | 100 | 3GO | 40 | ◯◯ | ◯◯ |
| Comparative Example 2 | — | — | — | — | — | — | PVB2 | 100 | 3GO | 40 | X | X |

INDUSTRIAL APPLICABILITY

The present invention can provide an interlayer film for laminated glass provided with an up-conversion function so as to be able to display high-contrast images while ensuring safety, and a laminated glass. The similar effect can be achieved even in a case where $NaYF_4$:Yb, Ho or $NaYF_4$:Yb, Tm were used instead of $NaYF_4$:Y, Er.

The invention claimed is:

1. An interlayer film for laminated glass, comprising lanthanoid-containing inorganic fine particles having an up-conversion function and a binder resin,
wherein the binder resin is a polyvinyl acetal resin,
wherein an amount of the lanthanoid-containing inorganic fine particles is 0.0001 to 20 parts by mass based on 100 parts mass of the binder resin, wherein the lanthanoid-containing inorganic fine particles contain $Y_2O_3$ or $NaYF_4$, ytterbium, and at least one selected from the group consisting of erbium, holmium, and thulium as lanthanoids, wherein the lanthanoid-containing inorganic fine particles have an average particle size of 1 µm or less, and wherein the interlayer film is used for producing laminated glass.

2. The interlayer film for laminated glass according to claim 1, wherein the interlayer film has a multilayer structure comprising:

a first resin layer containing a thermoplastic resin, an up-conversion layer containing the lanthanoid-containing inorganic fine particles having an up-conversion function and the binder resin, and a second resin layer containing a thermoplastic resin are laminated in a stated order in the thickness direction.

3. The interlayer film for laminated glass according to claim 1, further comprising a plasticizer.

4. A laminated glass comprising a pair of glass sheets and the interlayer film for laminated glass according to claim 1 interposed between the pair of glass sheets.

5. The interlayer film for laminated glass according to claim 1, wherein the amount of the lanthanoid-containing inorganic fine particles is 0.0001 to 10 parts by mass based on 100 parts by mass of the binder resin.

* * * * *